United States Patent [19]

Huebner et al.

[11] Patent Number: 4,568,718
[45] Date of Patent: Feb. 4, 1986

[54] POLYDIORGANOSILOXANE LATEX

[75] Inventors: David J. Huebner; John C. Saam, both of Midland, Mich.

[73] Assignee: Dow Corning Corporation, Midland, Mich.

[21] Appl. No.: 624,545

[22] Filed: Jun. 25, 1984

[51] Int. Cl.$^4$ .................. C08L 83/00; C08L 83/06; C08K 3/34; C08F 2/32
[52] U.S. Cl. .................. 524/837; 523/312; 523/334; 524/156; 524/158; 524/501; 524/588; 524/745; 524/747; 524/801; 525/100; 525/102; 525/106
[58] Field of Search .............. 524/801, 501, 588, 837, 524/156, 158, 745, 747; 523/312, 334; 525/100, 102, 106

[56] References Cited

U.S. PATENT DOCUMENTS

| | | | |
|---|---|---|---|
| 3,294,725 | 12/1966 | Findlay | 524/745 |
| 3,360,491 | 12/1967 | Axon | 260/29.2 |
| 3,697,469 | 10/1972 | Ikoma | 260/29.2 M |
| 3,706,695 | 12/1972 | Huebner et al. | 524/745 |
| 4,066,594 | 1/1978 | Moeller | 524/724 |
| 4,248,751 | 2/1981 | Willing | 524/588 |
| 4,273,634 | 6/1981 | Saam et al. | 524/588 |
| 4,273,813 | 6/1981 | Meddaugh | 427/387 |
| 4,431,982 | 2/1984 | Monroe et al. | 524/860 |

Primary Examiner—Herbert J. Lilling
Attorney, Agent, or Firm—Edward C. Elliott

[57] ABSTRACT

This invention is a method of producing an aqueous latex of crosslinked polydiorganosiloxane. The latex yields an elastomer upon removal of the water. The latex is prepared by homogenizing a mixture of hydroxyl endblocked polydiorganosiloxane; a silane of the formula $R_a'Si(OR^3)_{4-a}$ where $R'$ is a monovalent hydrocarbon radical of up to 12 carbon atoms, $R^3$ is an alkyl radical of 1 to 6 carbon atoms, a partial hydrolyzate, or mixture of silane and hydrolyzate, and $a$ is 0 or 1; a surface active anionic catalyst of the formulae $R^2C_6H_4SO_3H$ wherein $R^2$ is a monovalent hydrocarbon radical of at least 6 carbon atoms, $R^2OSO_2OH$, or

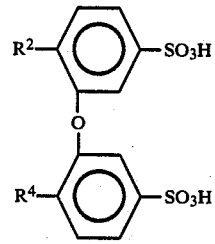

wherein $R^4$ is H or $R^2$; and water. The resulting emulsion is maintained at a temperature of 15° to 30° C. for at least 5 hours at a pH of less than 5 until a crosslinked polymer is formed, then this emulsion is admixed with base to a pH of greater than 7. The resulting emulsion is reinforced by adding greater than 1 part by weight of colloidal silica sol or silsesquioxane to yield a latex. Removal of water from the latex results in a reinforced elastomer. This method yields a latex which can be applied and dried immediately after mixing to yield an elastomer.

15 Claims, No Drawings

POLYDIORGANOSILOXANE LATEX

BACKGROUND OF THE INVENTION

1. Field of the Invention

This invention relates to a method of making aqueous emulsions of crosslinked polydiorganosiloxanes which yield reinforced elastomers.

2. Background Information

A method of polymerizing siloxanes and silcarbanes in emulsion by using a surface active sulfonic acid catalyst is disclosed by Findlay and Weyenberg in U.S. Pat. No. 3,294,725, issued Dec. 27, 1966. Their method, which comprises polymerizing and copolymerizing at least one member selected from organosiloxanes of the unit formula $R_nSiO_{4-n/2}$ and silcarbanes having the general formula $HO(R)_2SiQSi(R)_2OH$ in an aqueous medium while in the dispersed state, in the presence of a compound of the formula $R'C_6H_4SO_3H$ as the primary catalyst for the polymerization until the desired increase in molecular aggregation is obtained. These emulsions are stated to be characterized by extreme stability and extremely fine particle size. The products produced were higher molecular weight fluids or solids. In the particular embodiment in which the starting siloxane has a formula

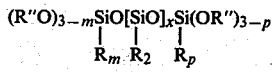

it is stated that the product, after neutralization, is a polysiloxane which does not appear gelled but when removed from the emulsion, does gel to a crosslinked rubber. Fillers can be added to the emulsion so that the strength of the rubber resulting from coagulation of the emulsion is further improved.

Axon discloses a method of polymerizing siloxanes and silcarbanes in emulsion employing organic sulfates of the general formula $R'OSO_2OH$ in U.S. Pat. No. 3,360,491, issued Dec. 26, 1967. His method comprises polymerizing and copolymerizing at least one member of the group consisting of organosiloxanes of the unit formula $R_nSiO_{4-n/2}$ and silcarbanes having the general formula $HO(R)_2SiQSi(R)_2OH$ by polymerizing in an aqueous medium while in a dispersed state in the presence of a compound of the formula $R'OSO_2OH$ until the desired increase in molecular aggregation is obtained. The emulsions are stated as being suitable for release agents and for coating compositions. His embodiment prepared from an alkylalkoxysiloxy endblocked diorganosiloxane is stated as polymerizing to a polysiloxane which does not appear to be gelled, but which when removed from the emulsion, does gel to a crosslinked rubber. Fillers can be added to the emulsion to improve the strength of the rubber resulting from the coagulation of the emulsion. The reinforced emulsion system provides an excellent method of obtaining coatings of tough rubbery siloxane films for release coatings.

A method for emulsion polymerization of organosiloxanes is disclosed by Ikoma in U.S. Pat. No. 3,697,469, issued Oct. 10, 1972. His method emulsifies, in water containing a salt-type anionic surface active agent, an organosiloxane having the unit formula $R_aSiO_{4-a/2}$ and then contacting said emulsion with an acid-type cationic exchange resin. The ion exchange converts the salt-type surface active agent to an acid-type thereby starting polymerization of the organosiloxane by making the emulsion an acid medium with a pH value of less than 4. The method is shown to polymerize organocyclosiloxanes, polysiloxane fluids, mixtures of organocyclosiloxanes and alkylalkoxysilanes, mixtures of organocyclosiloxanes and polysiloxane fluids, and alkylalkoxysilanes to give emulsions of polysiloxanes of increased viscosity. The emulsions are useful as coatings to give release properties, lubricants for textiles, and water repellent for textiles. An example combining an organocyclosiloxane and alkyltrialkoxysilane and polymerizing, then mixing the polymerized emulsion with a 10 percent sol of fine silica particles and dibutyltindioctoate emulsion gave a sheet upon drying which was a rubber.

A method of preparing an electrically conductive silicone emulsion is disclosed by Huebner and Meddaugh in U.S. Pat. No. 3,706,695, issued Dec. 19, 1972. The method dissolves a surface active sulfonic acid in water, mixes in a siloxane fluid and homogenizes the mixture to provide a stable dispersion. The dispersion is heated for at least one hour to polymerize the siloxanes, then adds a nonionic emulsifying agent and neutralizes the acid to give a pH of 6.5 to 9. Finely divided carbon black, a metallic salt of a carboxylic acid and a silane of the formula $RSi(OR')_3$ are then mixed into the emulsion. When the emulsion is applied to a substrate and dried, a heat stable electrically conductive silicone rubber is formed. Satisfactory cure is obtained for a period of about two weeks after mixing. The curability can be restored by adding additional catalyst, alkoxysilane or both.

SUMMARY OF THE INVENTION

This invention relates to a method of producing an aqueous latex of crosslinked polydiorganosiloxane. The aqueous latex is prepared by homogenizing a mixture of hydroxyl endblocked polydiorganosiloxane; a silane of the formula $R_a'Si(OR^3)_{4-a}$ where $R'$ is a monovalent hydrocarbon radical having up to 12 carbon atoms, $R^3$ is an alkyl radical having from 1 to 6 inclusive carbon atoms, and a is 0 or 1; a surface active anionic catalyst of the formula $R'C_6H_4SO_3H$ wherein $R'$ is a monovalent aliphatic hydrocarbon radical of at least 6 carbon atoms, of the formula $R'OSO_2OH$, or of the formula

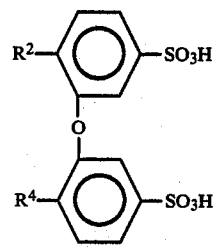

wherein $R''$ is H or $R'$; and water. The emulsion is reacted at a temperature of from about 15° to 30° C. for at least 5 hours at a pH of less than 5 until a crosslinked polymer emulsion is formed, then sufficient base is added to the emulsion to give a pH of greater than 7. The crosslinked polymer emulsion is reinforced by adding greater than 1 part by weight of colloidal silica sol or silsesquioxane to the emulsion. The product is a latex. Removal of water from the emulsion results in a reinforced elastomer.

The method of this invention yields a latex which can be utilized immediately after manufacture to yield reinforced crosslinked silicone elastomers. The latex yields an elastomer upon removal of the water, no further curing is required. The method yields a latex which can be stored for a period of months without significant change in its properties.

DESCRIPTION OF THE INVENTION

This invention relates to a method of producing an aqueous latex of crosslinked polydiorganosiloxane consisting essentially of (A) homogenizing immediately after admixing, a mixture consisting essentially of (1) 100 parts by weight of polydiorganosiloxane of the formula

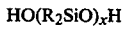
$$HO(R_2SiO)_xH$$

wherein each R is a radical selected from the group consisting of methyl, ethyl, propyl, phenyl, vinyl, allyl, and 3,3,3-trifluoropropyl, and x is an average value in the range of from 3 to 100 inclusive, (2) 0.5 to 15 parts by weight of an alkoxy silicon compound selected from the group consisting of a silane of the formula

$$R_a'Si(OR^3)_{4-a}$$

where R' is a monovalent hydrocarbon radical having up to 12 carbon atoms, $R^3$ is an alkyl radical having from 1 to 6 inclusive carbon atoms, and a is 0 or 1; a partial hydrolyzate of the silane where the partial hydrolyzate is soluble in the polydiorganosiloxane (1); and mixtures of silane and partial hydrolyzate, (3) from 20 to 100 millimoles of surface active anionic catalyst per kilogram of polydiorganosiloxane, where said catalyst is selected from the group consisting of a compound of the formula $R^2C_6H_4SO_3H$ wherein $R^2$ is a monovalent hydrocarbon radical of at least 6 carbon atoms; a compound of the formula $R^2OSO_2OH$ wherein $R^2$ is as defined above; a compound of the formula

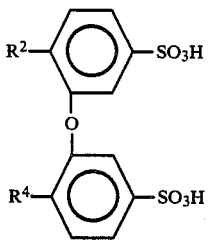

wherein $R^2$ is as defined above and $R^4$ is hydrogen or $R^2$; and mixtures thereof, and (4) water, then to yield an oil-in-water emulsion, then (B) maintaining the emulsion produced in (A) at a temperature of from 15° to 30° C. for at least 5 hours at a pH of less than 5 until a crosslinked polymer emulsion is formed, then (C) admixing sufficient base to raise the pH of the product of (B) to greater than 7, then (D) admixing greater than 1 part by weight of colloidal silica or colloidal silsesquioxane to yield a latex which produces an elastomer upon removal of the water at room temperature.

This inventive method produces a latex which contains crosslinked polydiorganosiloxane combined with colloidal silica, which yields useful elastomers upon evaporation of the water. Without the silica present, the latex yields a comparatively weak, continuous, crosslinked film. As used herein, an elastomer is a material that comprises the crosslinked polymer particles and the reinforcing colloidal silica or silsesquioxane as a material that has a useful tensile strength, stretches under tension, and retracts rapidly to recover its original dimensions.

The latices of this invention do not contain a metallic catalyst because the crosslinked polymer is readily formed in the emulsion without such a catalyst. Because no metallic catalyst is necessary, there is no problem with a catalyst continuing to cause crosslinking of the polymer during storage of the latex and causing a change of physical properties of the elastomer after varying storage times. Because there is no metallic catalyst, the heat stability of the resulting elastomer is expected to be superior to those products containing an active catalyst such as a tin compound. Because there is no metallic catalyst present, the elastomer produced by the method of this invention is expected to have a low toxicity.

The hydroxyl endblocked polydiorganosiloxanes (1) used in the method of this invention are well known in the art. The hydroxyl endblocked polydiorganosiloxane can be any of the polydiorganosiloxanes endblocked with hydroxyl radicals and can be represented by the formula

$$HO(R_2SiO)_xH$$

where each R is selected from the group consisting of methyl, ethyl, propyl, phenyl, vinyl, alkyl, and 3,3,3-trifluoropropyl, and mixtures thereof wherein at least 50 percent of the radicals are methyl radicals. The polydiorganosiloxane can be a single type polymer with the same kind of repeating diorganosiloxane units or it can be a combination of two or more kinds of repeating diorganosiloxane units, such as combinations of dimethylsiloxane units and methylphenylsiloxane units. The polydiorganosiloxane can also be a mixture of two or more kinds of polydiorganosiloxanes. The polydiorganosiloxanes are those in which x is an average value in the range of from 3 to 100 inclusive. The preferred polydiorganosiloxanes are those in which x is at least large enough that the viscosity of the polydiorganosiloxane is at least 0.05 Pa·s at 25° C. (x is about 25). A preferred polydiorganosiloxane is a polydimethylsiloxane having a viscosity of from about 0.05 Pa·s to 0.15 Pa·s at 25° C., the value of x for such a material being from about 25 to 80.

The alkoxy silicon compound (2) used in the method of this invention is selected from the group consisting of silane of the formula

$$R_a'Si(OR^3)_{4-a}$$

where R' is a monovalent hydrocarbon radical having up to 12 carbon atoms, $R^3$ is an alkyl radical having from 1 to 6 inclusive carbon atoms, and a is 0 or 1; a partial hydrolyzate of the silane where the partial hydrolyzate is soluble in the polydiorganosiloxane (1); and mixtures of the silane and the partial hydrolyzate. These alkoxy silicon compounds are well known in the art and many are commercially available. R' can be illustrated by radicals such as methyl, ethyl, propyl, isopropyl, butyl, hexyl, dodecyl, vinyl, allyl, phenyl, tolyl, and 3,3,3-trifluoropropyl. $R^3$ is an alkyl radical such as methyl, ethyl, propyl, and hexyl. Preferably both R' and $R^3$ are methyl. Preferred silanes include methyltrimethoxysilane and ethylorthosilicate with ethylorthosilicate most preferred. A preferred partial hydrolyzate of silane is ethylpolysilicate.

The amount of alkoxy silicon compound present can vary from 0.5 to 15 parts by weight based upon 100 parts by weight of the hydroxyl endblocked polydiorganosiloxane with a preferred amount of from 1 to 5 parts by weight. The amount of alkoxy silicon compound used has an effect upon the degree of crosslinking in the emulsion polymer. The preferred amount of crosslinker is dependent upon the hydroxyl endblocked polydiorganosiloxane used, the alkoxy silicon compound used, the time allowed for reaction, and the type and amount of surface active anionic catalyst. The preferred amount of crosslinker is determined by the users physical property requirements, in particular, how much elongation is desired in the elastomer produced. Higher amounts of alkoxy silicon compound cause more crosslinking so that the elongation of the elastomer falls to lower values.

The method of this invention uses a surface active anionic catalyst to form the emulsion and to catalyze the reaction of the hydroxyl endblocked polydiorganosiloxane and the alkoxy silicon compound. The surface active anionic catalyst is selected from the group consisting of a compound of the formula $R^2C_6H_4SO_3H$ wherein $R^2$ is a monovalent hydrocabon radical of at least 6 carbon atoms; a compound of the formula $R^2OSO_2OH$ wherein $R^2$ is as defined above; a compound of the formula

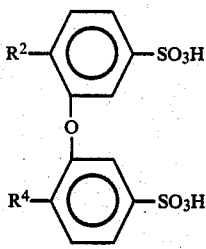

wherein $R^2$ is as defined above and $R^4$ is H or $R^2$; and mixtures thereof. $R^2$ contains at least 6 carbon atoms, and preferably no more than about 18 carbon atoms. $R^2$ includes hexyl, octyl, decyl, dodecyl, cetyl, myricyl, nonenyl, phytyl, and pentadecadienyl radicals. Most preferably $R^2$ has at least 10 carbon atoms. Preferred is the dodecyl radical.

The surface active anionic catalyst as used in this invention performs a dual function. The catalyst must function as a surfactant so that the hydroxyl endblocked polydiorganosiloxane is properly emulsified to form the oil-in-water emulsion. In such an emulsion, the surfactant forms a layer over the surface of the polydiorganosiloxane particles and keeps them from coalescing. The surfactant on the surface of the particles also acts as a catalyst in the reaction between the hydroxyl endblocked polydiorganosiloxane and the alkoxy silicon compound to crosslink the polydiorganosiloxane in the particles.

The sulfonic acids are available commercial products. The preferred sulfonic acids are dodecylbenzene sulfonic acid and dodecyldiphenyloxidedisulfonic acid. Hydrogen lauryl sulfate may be obtained by dissolving sodium lauryl sulfate in water, then adding hydrogen chloride to form the hydrogen lauryl sulfate and sodium chloride. Another method treats the sodium lauryl sulfate solution with a cation exchange resin which exchanges the sodium ion for hydrogen ion. The solution of hydrogen lauryl sulfate is then used as the catalyst in the method of this invention. The hydrogen lauryl sulfate can also be produced in situ by homogenizing the polydiorganosiloxane, alkoxy silicon compound, and water with sodium lauryl sulfate, then adding hydrogen chloride to the emulsion formed by the homogenization to convert the sodium lauryl sulfate to hydrogen lauryl sulfate catalyst. This in situ process is considered to fall within the slope of the claims.

The preferred amount of surface active anionic catalyst is slightly more than enough to saturate the surfaces of the emulsion polymer particles. For instance, with the procedure used in the examples, the emulsion particles have an average diameter of about 0.22 micrometer which would require about 89 millimoles of dodecylbenzene sulfonic acid per kilogram of polydimethylsiloxane.

The surface active anionic catalyst used and the amount used have an effect upon the physical properties of the elastomer produced from the latex formed following the method of this invention. When an excess of dodecylbenzene sulfonic acid was used much beyond that required to cover the polymer particles, the elastomers formed from the latex showed a decrease in tensile strength and initial modulus and an increase in elongation at break. When the amount of dodecylbenzene sulfonic acid was reduced to 20 percent of that required, the resulting elastomer had properties too low to properly measure. When dodecylbenzene sulfonic acid was replaced by hydrogen lauryl sulfate, the resulting elastomer had an initial modulus increase of five-fold and a four-fold reduction in percent elongation at break. The tensile strength remained about the same. Because the amount of surface active anionic catalyst appears to be related to the size of the particles of polydiorganosiloxane present in the emulsion, the amount of catalyst used depends upon the size of the particles. The preferred amount of surface active anionic catalyst found in this invention is calculated upon the consideration that the particles of polydiorganosiloxane in the emulsion are about 0.2 micrometer average diameter.

The emulsion of crosslinked polydiorganosiloxane of this invention is reinforced by adding greater than 1 part by weight of colloidal silica sol or silsequioxane per 100 parts by weight of hydroxyl endblocked polydiorganosiloxane to the emulsion. Without reinforcement, the elastomer film formed from the emulsion is weak. The colloidal silica sols are commercially available dispersions of colloidal silica in water. They are available at concentrations of colloidal silica varying from 15 percent to 50 percent by weight with average particle sizes varying from about 4 to 60 nanometers. The colloidal silica sols are available with pH of from about 8.5 to about 10.5 and at about 3. As the amount of colloidal silica used to reinforce the emulsion is increased, the initial modulus of elasticity remains nearly constant for amounts above 10 parts by weight colloidal silica per 100 parts by weight of polydiorganosiloxane.

The range of physical properties, such as tensile strength and elongation at break obtainable is about the same for the different colloidal silica sols. The amount of colloidal silica sol required for a given property depends upon which one is chosen. For example, a colloidal silica sol having an average particle diameter of about 4 nanometers gave a preferred combination of tensile strength and elongation at about 11 parts by weight silica per 100 parts by weight of polydiorganosiloxane, while a colloidal silica sol having an average particle diameter of about 15 nanometers gave preferred properties at about 30 parts by weight.

The preferred colloidal silica sols have particle sizes of from about 4 nanometers to 60 nanometers. The preferred amounts of colloidal silica sol are from 10 to 50 parts by weight per 100 parts of polydiorganosiloxane.

The emulsion can also be reinforced with colloidal silsesquioxane, for instance a methylsilsesquioxane having the unit formula $CH_3SiO_{3/2}$ which is prepared in an emulsion. The process of making these silsesquioxanes, having colloidal sized particles, of the formula $R''SiO_{3/2}$, is found in U.S. Pat. No. 3,433,780 issued Mar. 18, 1969 to Joseph Cekada, Jr. and Donald R. Weyenberg. Briefly, these silsesquioxanes are prepared by adding a silane, having the formula $R''Si(OR''')_3$, wherein $R''$ is a hydrocarbon or a substituted hydrocarbon radical containing from 1 to 7 carbon atoms, $R'''$ is a hydrogen atom, an alkyl group containing 1 to 4 carbon atoms (i.e. methyl, ethyl, isopropyl, or butyl), or

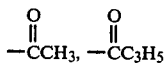

$-CH_2CH_2OH$, $-CH_2CH_2OCH_3$ or $-CH_2CH_2OC_2H_5$, to a water-surfactant mixture with agitation under acidic or basic conditions. The surfactant can be either anionic or cationic in nature as defined in the foregoing application. The amount of silane employed in the production of silsesquioxane should be less than about 10% by weight based on the combined weights of the silane, water and surfactant although up to about 35% by weight of silane can be employed if it is added to the water-surfactant mixture at the rate of less than one mol of silane per hour.

The silsesquioxanes can be employed in the form of the colloidal suspensions, as they are prepared, in this invention. Copolymers and blends of the silsesquioxanes can be employed in the emulsion as well as the individual ones and the formula $R''SiO_{3/2}$ is intended to include such materials.

The method of this invention combines a low molecular weight hydroxyl endblocked polydiorganosiloxane fluid as described above, an alkoxy silicon compound, and a surface active anionic catalyst with water and homogenizes the mixture immediately after combining the ingredients to form an oil-in-water emulsion, that is, an emulsion of particles of polydiorganosiloxane dispersed in water. It is preferred that the alkoxy silicon compound and the hydroxyl endblocked polydiorganosiloxane fluid be combined and then added to the surface active anionic catalyst which has been dispersed in water. Sufficient water is present to allow the formation of an oil-in-water emulsion. The preferred amount of water is at least 20 percent by weight of the emulsion with about 40 to 80 percent by weight most preferred. This emulsion, formed by homogenizing the mixture, is stable on standing; that is, it does not cream or precipitate. The emulsion contains particles having an average diameter of about 225 nanometers. Upon standing at room temperature, the ingredients react so that the polydiorganosiloxane fluid becomes crosslinked. During polymerization, the pH of the emulsion is below 5. The polymerization is allowed to continue for a period of at least 5 hours. It is thought that the polymerization proceeds first by chain extension, then by a combination of polymerization and crosslinking to yield particles of higher molecular weight crosslinked polymer. The extent and rate of polymerization or reaction between the polydiorganosiloxane and the alkoxy silicon compound are affected by several parameters such as the type and amount of alkoxy silicon compound and the type and amount of surface active anionic catalyst. The preferred period of time for reaction when using ethylorthosilicate as the alkoxy silicon compound is about 12 hours, when 93 millimoles of dodecylbenzene sulfonic acid per kilogram of polydiorganosiloxane is used as the surface active anionic catalyst, the emulsion has particles of about 225 nanometers average diameter, and the emulsion is reinforced with 20 parts by weight of colloidal silica per 100 parts by weight of polydiorganosiloxane. Tests have shown that useful products are produced with the reaction time of 100 hours and greater.

After the polymerization has progressed as far as desired, the reaction is halted by admixing sufficient base into the emulsion to raise the pH to greater than 7. A preferred method uses a dilute aqueous solution of sodium hydroxide or ammonium hydroxide.

The emulsion is reinforced by adding greater than 1 part by weight of colloidal silica sol or silsesquioxane to the emulsion to yield a latex. These reinforcing agents have been discussed above. An elastomer can be formed from the latex by removal of the water from the latex. The latex preferably has a solids content of greater than 20 percent by weight. Solids content is defined as the percent by weight of the emulsion remaining after exposure of the emulsion to the atmosphere, to remove the water, for a period of time sufficient to approach equilibrium; 7 days at 50 percent relative humidity and 70° F. is typical. Emulsions with a solids content of less than 40 percent tend to crack upon drying a cast film as in preparing an elastomeric film. Preferred for casting films or coatings of greater than 1 mm wet thickness, for example, are solids contents of 40 to 60 percent. Solids contents below 40 percent can be used for coating or impregnating as in treating paper or fabric. The water can be removed by evaporation at room temperature or by heating. The latex provides an elastomer with useful properties immediately upon removal of the water. The physical properties of the cured elastomer have been found to change to some degree upon aging after drying of the elastomer.

The physical properties of the elastomer films can be modified by the addition of surface active anionic or non-anionic surfactant after the neutralization step. This modification is especially useful in obtaining a higher elongation in the elastomer film, however, there is also some loss of tensile strength.

Additional ingredients may be added to the aqueous latex of this invention to alter the properties of the elastomer produced by drying the latex as long as they are evaluated to ensure that they do not effect the stability of the latex or its ability to cure upon removal of the water. Typical additives include other fillers, such as ground silica, pigments or dyes, and heat stability additives such as iron oxide.

The latex of this invention is useful in those applications where an elastomeric coating on a substrate is desired. The elastomer is formed by removing the water to yield a cured, crosslinked material without any curing step required. The coating can be used as a paper coating, for instance, or as a construction coating. The latex can also be cast into thick films or molded parts to form elastomeric parts. By using a higher solids content, and/or extending fillers, the emulsion can be thickened to produce an aqueous material useful as a caulking material. The emulsion may be combined with carbon black, graphite, or graphite fibers to yield cured films which are electrically conductive.

The following examples are presented for purposes of illustrating the invention and should not be construed as limiting the scope of the invention which is properly delineated in the claims. All parts are parts by weight.

EXAMPLE 1

A first mixture was prepared by dissolving 19.5 g of dodecylbenzene sulfonic acid (surface active anionic catalyst) in 850 g of distilled water which provided 70.3 mmol (millimole) catalyst per kilogram of polydimethylsiloxane. A second mixture was prepared by mixing 850 g of hydroxyl endblocked polydimethylsiloxane fluid having a viscosity of about 0.09 Pa·s at 25° C. with 25.5 g of ethylorthosilicate. The two mixtures were then immediately combined, mixed, and while being agitated to maintain a homogenious mixture, were passed through a laboratory homogenizer twice at a pressure of 53.7 MPa. The resulting emulsion was allowed to stand at 21° C. for 72 hours. It was then adjusted to a pH of 7.5 by adding a 3 percent solution of sodium hydroxide in water. The emulsion contained particles of crosslinked polymer having an average particle size of about 0.2 micrometer, measured by a hydrodynamic chromotography method.

Then 25 g of the above emulsion having a solids content of about 50 percent by weight, was mixed with 7.7 g of a colloidal silica sol having a solids content of about 30 percent by weight, a pH of 10, and colloidal silica particles having an average particle size of about 8 nanometers to give a latex. This calculates to be about 18 parts of colloidal silica by weight for each 100 parts by weight of polydimethylsiloxane fluid. This latex contained about 45 percent by weight solids and about 55 percent by weight water. An elastomer was formed by pouring the latex into a container and allowing to dry at 21° C. The tough semi-translucent elastomeric film had a tensile strength of 2.17 MPa and an elongation at break of 329 percent.

EXAMPLE 2

Latexes were prepared to discover the difference caused by different surface active anionic catalysts in otherwise comparable compositions.

A mixture was prepared of 15 g of dodecylbenzene sulfonic acid catalyst, 500 g of water, 500 g of the hydroxyl endblocked polydimethylsiloxane fluid of Example 1, and 10 g of methyltrimethoxysilane, the mixture being agitated to maintain homogeneity and being homogenized by passing twice through a homogenizer at a pressure of 53.7 MPa. The emulsion was allowed to polymerize for 4 days at 22° C., then was neutralized with a 3 percent solution of sodium hydroxide. During polymerization there was about 89.6 millimoles of the catalyst present per kilogram of polydimethylsiloxane.

A second mixture was made using the amounts as above, but using sodium lauryl sulfate as a surfactant to form the emulsion. Immediately after homogenization, 300 g of the emulsion was mixed with 3 g of 5 N hydrochloric acid. The hydrochloric acid reacted with the sodium lauryl sulfate to give hydrogen lauryl sulfate as the catalyst and sodium chloride. After 4 days at 22° C. for polymerization and crosslinking, the emulsion was neutralized in the same manner as above.

A 50 g portion of each of the above emulsions was mixed with 15.3 g of the colloidal silica of Example 1 to give latexes. The latexes had a solids content of about 46.2 percent by weight. Films were cast and air dried to give elastomers. The dried elastomeric films were tested with the following results:

| Catalyst | Tensile Strength MegaPascal | Elongation Percent |
| --- | --- | --- |
| Dodecylbenzene sulfonic acid | 1.34 | 399 |
| Hydrogen lauryl sulfate | 1.23 | 109 |

EXAMPLE 3

A series of emulsions were prepared and tested using different alkoxy silicon compounds. The polymerization time was also varied.

Each sample was prepared by blending 100 parts of the hydroxyl endblocked polydimethylsiloxane fluid of Example 1 with 0.15 moles of the alkoxy silicon compound shown in Table I. This mixture was immediately combined with a solution of 3 parts of dodecylbenzene sulfonic acid in 100 parts of distilled water. The resulting mixture was immediately homogenized to form an emulsion having particles of a diameter averaging about 225 nanometers. The emulsions were allowed to polymerize for the periods of time shown in Table 1 at 21° C., at which time, samples were withdrawn and adjusted to a pH of about 9 with a 3 percent by weight solution of sodium hydroxide in water. The samples were then combined with sufficient colloidal silica sol, as described in Example 1, to give 20 parts of colloidal silica per 100 parts of polymer to give latexes. The latexes had a solids content of about 47.5 percent by weight.

The samples of latex were then cast into films and dried at 21° C. for one week. The films were then tested for physical properties with the results shown in Table I.

The test results show that the tensile strength increases as the size of the substituents on the alkoxy silicon compound molecule decreases. The time required for development of mechanical properties is also affected by the alkoxy silicon compound used in the polymerization, as shown by the fact that in general the latexes made with the larger substituents had to polymerize for longer periods of time before they would cure to give elastomeric films.

TABLE I

| Alkoxy Silicon Compound | Time of Polymerization Hours | Tensile Strength MPa | Elongation percent |
| --- | --- | --- | --- |
| $C_{12}H_{25}Si(OMe)_3$ | 7 | Sticky gum | — |
|  | 96 | * | — |
| n-PrSi(OMe)$_3$ | 7 | Tacky rubber | — |
|  | 24 | 0.52 | 65 |
|  | 96 | 0.64 | 151 |
| PhSi(OMe)$_3$ | 7 | 0.50 | 26 |
|  | 24 | 0.75 | 143 |
|  | 96 | 1.09 | 192 |
| MeSi(OMe)$_3$ | 6 | 0.60 | 20 |
|  | 24 | 1.13 | 271 |
|  | 96 | 1.34 | 399 |
| EPS | 7 | 0.93 | 198 |
|  | 24 | 1.50 | 326 |

TABLE I-continued

| Alkoxy Silicon Compound | Time of Polymerization Hours | Tensile Strength MPa | Elongation percent |
|---|---|---|---|
|  | 96 | 1.54 | 338 |
| EOS | 7 | 1.47 | 200 |
|  | 24 | 1.50 | 189 |
|  | 96 | 2.40 | 295 |

Pr = propyl
Ph = phenyl
Me = methyl
EPS = ethylpolysilicate
EOS = ethylorthosilicate, Si(OEt)$_4$
Et = ethyl
*Film too weak to measure.

EXAMPLE 4

This experiment was run to determine the effect of reaction time upon the degree of crosslinking in the emulsion particles and the effect upon the physical properties of elastomers made from the different emulsions.

An emulsion was prepared by mixing 100 parts of the hydroxyl endblocked polydimethylsiloxane fluid of Example 1 thoroughly with 0.15 moles of methyltrimethoxysilane per kilogram of the polydimethylsiloxane fluid (2 parts by weight methyltrimethoxysilane per 100 parts by weight fluid). This mixture was then added to 100 parts of a solution of 3 weight percent of dodecylbenzene sulfonic acid in distilled water. The entire mixture was briefly, but vigorously, agitated, then homogenized in a laboratory homogenizer at 53.7 MPa. This emulsion was rehomogenized and then allowed to polymerize at 21° C. for the periods of time shown in Table II.

After each of the reaction times shown in Table II, a portion of the emulsion was removed and adjusted to a pH of 9.3 by adding a solution of 3 wt. percent of sodium hydroxide in distilled water to stop the reaction.

The degree of crosslinking of the polymer in the emulsion was then judged by measuring the intrinsic viscosity of an organosol from the polymer by measuring the flow times of the organosol at 4 different concentrations, then calculating relative viscosities from the flow times and plotting the log of the relative viscosity divided by the concentration versus the concentration to determine the intrinsic viscosity at zero concentration. The procedure used is similar to that disclosed by Shashoua and Beaman, "Microgel in Idealized Polymer Molecules," Journal of Polymer Science, Vol. 33, 1958, page 101.

The organosols were prepared by adding 4.8 g of each emulsion to a mixture of 34 g of anhydrous sodium sulfate and 86 cc of heptane. This mixture was stirred for 5 minutes, then allowed to sit for 10 minutes to allow the salt to settle out. The organosol was decanted, allowed to sit for 3 more days and again decanted to yield a clear organosol.

The organosol, having a concentration of 1.46 g of polymer per 100 cc was diluted to concentrations of 0.723 g, 0.482 g, and 0.361 g per 100 cc and the flow time of each solution measured in an Oswald-Fenske Viscometer. The relative viscosities were calculated where relative viscosity equals measured flow time divided by heptane flow time. The log of the relative viscosity divided by the concentration was calculated, then a plot of these values versus the concentration was constructed and the intrinsic viscosity at a concentration of zero was determined from the plot. These values are shown in Table II. During the initial reaction, for a period up to approximately 6 hours the reaction appears to be one primarily of chain extension because the polymer viscosity in the organosol is rising. After this period the crosslinking predominates as shown by the decreasing viscosities of the organosols as the reaction time increases. As the crosslink density of the polymer increases, the polymer particles do not swell as much when they are transferred to the heptane organosol so that the viscosity of the organosol becomes lower.

Portions of the emulsion, at each reaction time, were also made into latex and tested for physical properties. To 50 g of the emulsion was added 15.33 g of the colloidal silica sol of Example 1 to give a latex having 20 parts of silica per 100 parts of polymer and a solids content of about 46.8 percent by weight. This latex was thoroughly stirred, then 30 g was immediately poured into a polystyrene Petri dish, 9 cm in diameter, and allowed to dry. After drying for about 24 hours to remove water, the film was elastomeric. After a 1 month period to allow the films to come to equilibrium with the atmosphere, the elastomers had the tensile strength and elongation at break shown in Table II. The more crosslinked polymers produced by the longer reaction times had the higher tensile strength and elongation at break. A reaction time of 336 hours appears to be long enough to allow enough crosslinking to cause the elongation at break to be lower than that of shorter reaction times.

TABLE II

| Reaction Time hours | Organosol Intrinsic Viscosity | Elastomer | |
|---|---|---|---|
| | | Tensile Strength MPa | Elongation percent |
| 2 | 0.891 | 0 | 0 |
| 6 | 1.002 | 0.60 | 20 |
| 11 | 0.814 | 0.84 | 192 |
| 24 | 0.716 | 1.13 | 271 |
| 96 | 0.587 | 1.34 | 399 |
| 336 | — | 1.69 | 320 |

That which is claimed:
1. A method of producing an aqueous latex of crosslinked polydiorganosiloxane consisting essentially of
(A) homogenizing immediately after admixing, a mixture consisting essentially of
(1) 100 parts by weight of polydiorganosiloxane of the formula HO(R$_2$SiO)$_x$H wherein each R is a radical selected from the group consisting of methyl, ethyl, propyl, phenyl, vinyl, allyl, and 3,3,3-trifluoropropyl, and x is an average value in the range of from 3 to 100 inclusive,
(2) 0.5 to 15 parts by weight of an alkoxy silicon compound selected from the group consisting of a silane of the formula R$_a'$Si(OR$^3$)$_{4-a}$ where R' is a monovalent hydrocarbon radical having up to 12 carbon atoms, R$^3$ is an alkyl radical having from 1 to 6 inclusive carbon atoms, and a is 0 or 1; a partial hydrolyzate of the silane where the partial hydrolyzate is soluble in the polydiorganosiloxane (1); and mixtures of silane and partial hydrolyzate, (3) from 20 to 100 millimoles of surface active anionic catalyst per kilogram of polydiorganosiloxane, where said catalyst is selected from the group consisting of a compound of the formula R²C₆H₄SO₃H wherein R² is a monovalent hydrocarbon radical of at least 6 carbon atoms; a compound of the formula R²OSO₂OH wherein R² is as defined above; a compound of the formula

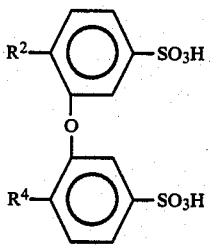

wherein R² is as defined above and R⁴ is hydrogen or R²; and mixtures thereof, and
(4) water, to yield an oil-in-water emulsion, then
(B) maintaining the emulsion produced in (A) at a temperature of from 15° to 30° C. for at least 5 hours at a pH of less than 5 until a crosslinked polymer emulsion is formed, then
(C) admixing sufficient base to raise the pH of the product of (B) to greater than 7, then
(D) admixing greater than 1 part by weight of colloidal silica or colloidal silsesquioxane to yield a latex which produces an elastomer upon removal of the water at room temperature.

2. The method of claim 1 in which R' is selected from the group consisting of methyl, ethyl, propyl, and phenyl and R³ is selected from the group consisting of methyl, ethyl, and propyl.

3. The method of claim 1 in which R² has an average of 12 carbon atoms.

4. The method of claim 1 in which the alkoxy silicon compound is present in an amount of from 1 to 5 parts by weight and is chosen from the group consisting of ethylorthosilicate, ethylpolysilicate, methyltrimethoxysilane, and phenyltrimethoxysilane.

5. The method of claim 4 in which the catalyst is dodecylbenzene sulfonic acid.

6. The method of claim 4 in which the catalyst is hydrogen lauryl sulphate.

7. The method of claim 4 in which the catalyst is dodecyldiphenyloxidedisulfonic acid.

8. The method of claim 5 in which (E) is 10 to 50 parts by weight of colloidal silica derived from an aqueous sol and having particle sizes of from about 4 nanometers to 60 nanometers.

9. The method of claim 8 in which the water is less than 60 percent by weight of the latex.

10. The aqueous latex produced by the method of claim 1.

11. The aqueous latex produced by the method of claim 8.

12. The aqueous latex produced by the method of claim 9.

13. The elastomer produced by removing the water from the latex of claim 10.

14. The elastomer produced by removing the water from the latex of claim 11.

15. The elastomer produced by removing the water from the latex of claim 12.

* * * * *